(12) United States Patent
Mimatsu et al.

(10) Patent No.: US 8,492,922 B2
(45) Date of Patent: Jul. 23, 2013

(54) POWER SUPPLY APPARATUS ACTIVATING METHOD

(75) Inventors: Naoyuki Mimatsu, Utsunomiya (JP); Toshihiro Sone, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/512,792

(22) PCT Filed: Nov. 1, 2010

(86) PCT No.: PCT/JP2010/069423
§ 371 (c)(1),
(2), (4) Date: Sep. 18, 2012

(87) PCT Pub. No.: WO2011/068003
PCT Pub. Date: Jun. 9, 2011

(65) Prior Publication Data
US 2013/0038120 A1   Feb. 14, 2013

(30) Foreign Application Priority Data
Dec. 1, 2009  (JP) ................................. 2009-273332

(51) Int. Cl.
*B60L 1/00* (2006.01)
(52) U.S. Cl.
USPC ........................................................ 307/9.1
(58) Field of Classification Search
USPC .................................. 307/9.1, 10.1; 327/588
See application file for complete search history.

(56) References Cited

U.S. PATENT DOCUMENTS

| 2005/0099155 A1 | 5/2005 | Okuda et al. |
| 2009/0009144 A1* | 1/2009 | Hoshikawa et al. ........... 320/166 |

(Continued)

FOREIGN PATENT DOCUMENTS

| EP | 1928078 A1 | 6/2008 |
| JP | 2004-112859 | 4/2004 |

(Continued)

OTHER PUBLICATIONS

International Search Report for Application No. PCT/JP2010/069423, 2 pages, dated Feb. 8, 2011.

(Continued)

*Primary Examiner* — Daniel Cavallari
(74) *Attorney, Agent, or Firm* — Nelson Mullins Riley & Scarborough LLP; Anthony A. Laurentano

(57) ABSTRACT

The two ends of a battery circuit (18), in which a first power supply (11) is connected in series to a second power supply (12), are connected to the respective first and third lines (L1 and L3), while a junction (18*a*) between the first power supply (11) and the second power supply (12) is connected to a second line (L2). The two ends of a switching circuit (33) are connected to the respective first and third lines (L1 and L3). An end of a reactor (34) is connected to a junction between first and second switching elements (31 and 32), while the other end of the reactor (34) is connected to the second line (L2).
The power supply apparatus (10), when activated, executes an operation in which, while the ON state of the first switching element (31) is inhibited, only the second switching element (32) is alternately turned ON and OFF with the ON state duration changed such that the ON state duration has a tendency to become longer. Thereafter, the power supply apparatus (10) executes an operation in which the switching elements (31 and 32) are alternately turned ON.

6 Claims, 9 Drawing Sheets

U.S. PATENT DOCUMENTS

| | | | |
|---|---|---|---|
| 2009/0058383 A1* | 3/2009 | Ryoo | 323/282 |
| 2009/0179616 A1 | 7/2009 | Ichikawa et al. | |
| 2009/0284080 A1 | 11/2009 | Kojima et al. | |
| 2010/0148740 A1* | 6/2010 | Saitoh | 323/283 |

FOREIGN PATENT DOCUMENTS

| | | |
|---|---|---|
| JP | 2007-318938 | 12/2007 |
| WO | 2004/055963 A1 | 7/2004 |
| WO | 2010/047422 A2 | 4/2010 |

OTHER PUBLICATIONS

Di Napoli, A. et al., "Multiple Input DC-DC Power Converter for Fuel-Cell Powered Hybrid Vehicles," 2002 IEEE Annual Power Electronics Specialists Conference, vol. 4:1685-1690 (2002).

Supplementary European Search Report for Application No. 10834456-5, 4 pages, dated Jun. 5, 2013.

* cited by examiner

US 8,492,922 B2

POWER SUPPLY APPARATUS ACTIVATING METHOD

RELATED APPLICATIONS

This application is a 35 U.S.C. 371 national stage filing of International Application No. PCT/JP2010/069423, filed Nov. 1, 2010, which claims priority to Japanese Patent Application No. 2009-273332 filed on Dec. 1, 2009 in Japan. The contents of the aforementioned applications are hereby incorporated by reference.

TECHNICAL FIELD

The present invention relates to a power supply apparatus activating method.

Priority is claimed on Japanese Patent Application No. 2009-273332, filed Dec. 1, 2009, the content of which is incorporated herein by reference.

BACKGROUND ART

In the related art, a power supply system is known which includes, for example, a first DC-DC converter connected to a fuel cell and a second DC-DC converter connected to a storage device, and supplies power for a load such as an electric motor for driving a vehicle from the first and second DC-DC converters (for example, refer to Patent Document 1).

CITATION LIST

Patent Document

Patent Document 1: Japanese Unexamined Patent Application, First Publication No. 2007-318938

SUMMARY OF INVENTION

Technical Problem

In the power supply system according to the related art, since the DC-DC converters are provided for the respective plurality of power supplies (that is, the fuel cell and the storage device), costs necessary for the configuration of the power supply system are increased, and the size of the power supply system is also increased.

For this reason, it is desirable to reduce costs and miniaturize the size.

In addition, when the power supply system including a plurality of power supplies (that is, the fuel cell and the storage device) is started, particularly, when the DC-DC converters are started, it is desirable to prevent an unexpected excessive current from flowing in a circuit system.

Aspects related to the present invention aim at providing a power supply apparatus activating method capable of reducing costs necessary for a configuration, miniaturizing the size, and preventing an excessive current from flowing at the time of being started.

Solution to Problem

According to an aspect of the present invention, there is provided a power supply apparatus activating method, in which the power supply apparatus includes a first line, a second line, and a third line having different potentials so as to have a tendency to be sequentially decreased; a battery circuit where a first power supply and a second power supply are connected in series to each other; and a DC-DC converter formed by a switching circuit where a first switching element and a second switching element respectively having freewheeling diodes are connected in series to each other, and a reactor, and in which two ends of the battery circuit are connected to the first line and the third line, a junction between the first power supply and the second power supply of the battery circuit is connected to the second line, an end portion on the first switching element side of the switching circuit is connected to the first line, an end portion on the second switching element side of the switching circuit is connected to the third line, one end of the reactor is connected to a junction between the first and second switching elements, and the other end of the reactor is connected to the second line, the method including a step of executing a one-side switching mode in which, when the power supply apparatus is activated, while an ON state of the first switching element is inhibited, only the second switching element is alternately turned ON and OFF, with the ON state duration of the second switching element changed so as to have a tendency to become longer; and a step of executing an alternating switching mode in which the first switching element and the second switching element are alternately turned ON.

In the aspect, an activating method may be further employed in which, when the one-side switching mode is executed, in a case where a current continuously flows through the reactor within a switching cycle of the second switching element, the execution of the one-side switching mode is switched to the execution of the alternating switching mode.

In the aspect, an activating method may be further employed in which, during one switching cycle of the second switching element when the one-side switching mode is executed, in a case where a terminal end of the current of a triangular waveform flowing through the reactor matches an end of the switching cycle, the execution of the one-side switching mode is switched to the execution of the alternating switching mode.

In the aspect, an activating method may be further employed in which, during a time period of half a switching cycle of the second switching element when the one-side switching mode is executed, in a case where the current flowing through the reactor monotonically increases, it is regarded that the current continuously flows through the reactor within the switching cycle.

Advantageous Effects of Invention

According to the power supply apparatus activating method in the aspect related to the present invention, the one-side switching mode is executed before executing the alternating switching mode, thereby the first switching element is turned OFF, the second switching element is turned ON, and the reactor is DC-excited.

Thereby, even if the first switching element is turned ON and the second switching element is turned OFF in the alternating switching mode, it is possible to prevent an excessive current from flowing from the fuel cell stack or the storage device.

In addition, it is possible to prevent the switching elements from being damaged by the excessive current.

In addition, it is possible to switch between a plurality of operation modes simply by providing the single DC-DC converter for the battery circuit where the fuel cell stack and the storage device are connected in series to each other. Therefore, it is possible to reduce costs necessary for the configuration and miniaturize the size thereof, as compared with, for example, a case where a DC-DC converter is separately provided for each of the fuel cell stack and the storage device.

According to the activating method related to the further aspect, in a case where the reactor current continuously flows within the switching cycle in the one-side switching mode, it is possible to prevent an unintended excessive current from flowing in the circuit system, and to thereby stably perform a switching transfer from the one-side switching mode to the alternating switching mode.

According to the activating method related to the further aspect, if during a time period when the first switching element is turned OFF, the second switching element is turned ON, and the reactor is DC-excited, a current flowing through the reactor monotonically increases, and, next, during a time period when the first switching element and the second switching element are turned OFF, and magnetic energy accumulated in the reactor is consumed, the current flowing through the reactor monotonically decreases, then, the current flowing through the reactor has a triangular waveform.

In a case where a terminal end of the current of the triangular waveform matches an end of the switching cycle in this state, it is possible to prevent an unintended excessive current from flowing in the circuit system, and to thereby stably perform a switching transfer from the one-side switching mode to the alternating switching mode.

According to the activating method related to the further aspect, the second switching element can switch between the ON state and the OFF state every time period of half the switching cycle while the first switching element is maintained in the OFF state. Therefore, in a case where the current flowing through the reactor has an isosceles triangular waveform, the current flowing through the reactor is detected only during the time period of half the switching cycle, and thereby it is possible to determine whether or not a current continuously flows through the reactor within the switching cycle.

Thereby, it can be promptly determined whether or not a switching transfer to the alternating switching mode from the one-side switching mode is possible.

DESCRIPTION OF EMBODIMENTS

Hereinafter, a power supply apparatus in embodiments related to the present invention will be described with reference to the accompanying drawings.

Figure 1:
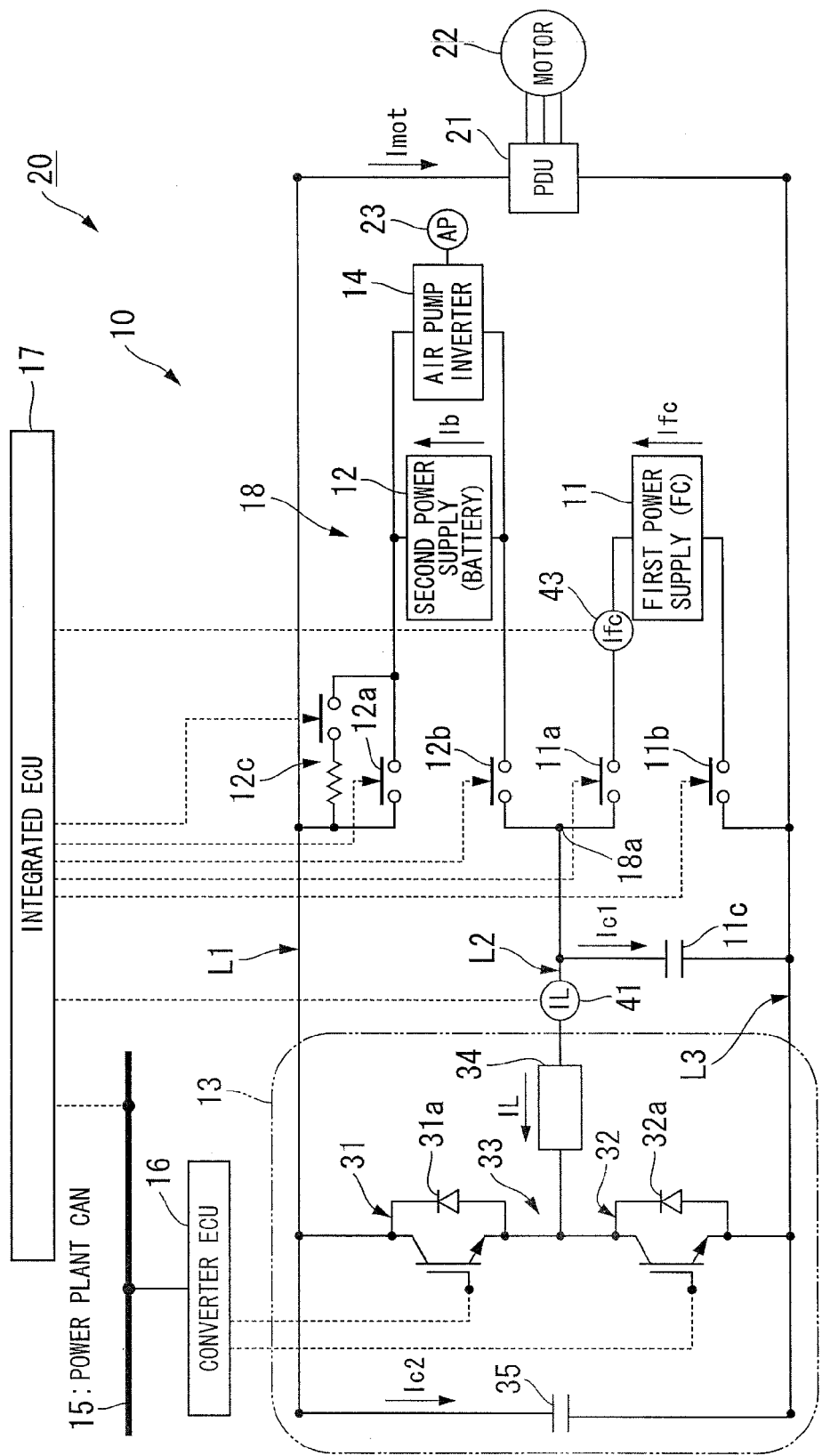
FIG. 1 is a configuration diagram of a power supply system for a fuel cell vehicle having the power supply apparatus.

A power supply apparatus 10 in the present embodiment includes, as shown in FIG. 1, a fuel cell stack (fuel cell, FC) 11 forming a first power supply, a battery (storage device) 12 forming a second power supply, a DC-DC converter 13, an air pump inverter (API) 14, and a converter ECU (Electronic Control Unit) 16 and an integrated ECU (Electronic Control Unit) 17 which are connected to a power plant CAN 15 formed by a CAN (Controller Area Network) communication line. In addition, the fuel cell stack 11 is connected in series to the battery 12 so as to form a battery circuit 18.

The power supply apparatus 10 is provided in, for example, a power supply system 20 of a fuel cell vehicle, and the power supply system 20 of a fuel cell vehicle includes, for example, the power supply apparatus 10, a PDU (Power Drive Unit) 21, a vehicle driving motor 22, and an air pump (AP) 23.

The fuel cell stack 11 has a configuration where an electrolyte electrode structure is formed by interposing a solid polymer electrolyte membrane formed from a cation exchange membrane or the like between a fuel electrode (anode) formed from an anode catalyst and a gas diffusion layer and an oxygen electrode (cathode) formed from a cathode catalyst and a gas diffusion layer, and a fuel battery cell formed by interposing the electrolyte electrode structure between a pair of separators is laminated in a plurality of sets. The laminate of the fuel battery cells is pinched by a pair of end plates on both sides in the laminate direction.

The cathode of the fuel cell stack 11 is supplied with air which is an oxidant gas (reaction gas) including oxygen from the air pump 23, and the anode thereof is supplied with a fuel gas (reaction gas) including hydrogen from, for example, a high pressure hydrogen tank (not shown).

The hydrogen which is ionized by the catalytic reaction on the anode catalyst of the anode moves to the cathode via the appropriately humidified solid polymer electrolyte membrane. Electrons generated according to the movement are drawn out to an external circuit, and are used as DC electric energy. At this time, at the cathode, the hydrogen ions, the electrons, and the oxygen react with each other, thereby generating water.

In addition, the air pump 23 takes in the air from, for example, the outside of the vehicle, compresses the air, and supplies the air to the cathode of the fuel cell stack 11 as a reaction gas. The rotational speed of a pump driving motor (not shown) driving the air pump 23 is controlled by the air pump inverter 14, for example, formed from a PWM inverter or the like using a pulse width modulation (PWM), on the basis of a control command output from the integrated ECU 17.

In addition, instead of the battery 12, the power supply apparatus 10 may be provided with, for example, a capacitor formed from an electric double-layer capacitor or an electrolytic capacitor as a storage device.

The DC-DC converter 13 is a chopper type DC-DC converter, and includes a switching circuit 33 where first and second switching elements (for example, IGBT: Insulated Gate Bipolar mode Transistor) 31 and 32 respectively having free-wheeling diodes 31a and 31b are connected in series to each other, a reactor 34 formed from a choke coil, and a smoothing capacitor 35.

The switching circuit 33 is driven by a signal (PWM signal) which undergoes the pulse width modulation (PWM), is output from the converter ECU 16 and is input to each of gates of the switching elements 31 and 32.

For example, in an alternating switching mode, a state where the first switching element 31 forming a high side arm (upper arm) of the DC-DC converter 13 is turned ON, and the second switching element 32 forming a low side arm (lower arm) is turned OFF, and a state where the first switching element 31 forming the high side arm is turned OFF, and the second switching element 32 forming the low side arm is turned ON, are alternately switched.

In addition, for example, in a one-side switching mode, the first switching element 31 forming the high side arm (upper arm) of the DC-DC converter 13 is maintained to be turned OFF, and the second switching element 32 forming the low side arm (lower arm) is alternately turned ON and OFF.

Three lines L1, L2 and L3 have different potentials so as to have a tendency to be sequentially decreased. For example, a potential of L1 is the highest, a potential of L3 is the lowest, and a potential of L2 is intermediate. An end portion on the first switching element 31 side of the switching circuit 33 is connected to the first line L1, and an end portion on the second switching element 32 side of the switching circuit 33 is connected to the third line L3.

In addition, the smoothing capacitor 35 is connected to the first line L1 and the third line L3.

Further, one end of the reactor 34 is connected to a junction (for example, between the collector and the emitter) between the first and second switching elements 31 and 32, and the other end thereof is connected to the second line L2.

In the DC-DC converter 13, in a case of a boosting operation from a primary side to a secondary side, for example, when the motor 22 is driven or the like, first, the first switching element 31 of the high side arm is turned OFF, and the second switching element 32 of the low side arm is turned ON. The reactor 34 is DC-excited by a current input from the primary side, and thus magnetic energy is accumulated.

When the first switching element 31 of the high side arm is turned ON and the second switching element 32 of the low side arm is turned OFF, the current flowing through the reactor 34 is interrupted. As a result, an electromotive force (induced voltage) is generated between both ends of the reactor 34 so as to prevent variations in magnetic flux, an induced voltage caused by the magnetic energy accumulated in the reactor 34 is added to an input voltage of the primary side, and thereby a boost voltage higher than the input voltage of the primary side is applied to the secondary side. The voltage variations generated according to the switching operation are smoothed by the smoothing capacitor 35, and then the boost voltage is output from the secondary side.

On the other hand, for example, in a case of a regenerative operation from the secondary side to the primary side when the motor 22 is regenerated or the like, first, the first switching element 31 of the high side arm is turned OFF, and the second switching element 32 of the low side arm is turned ON. The reactor 34 is DC-excited by a current input from the secondary side, and thus magnetic energy is accumulated.

When the first switching element 31 of the high side arm is turned ON and the second switching element 32 of the low side arm is turned OFF, the current flowing through the reactor 34 is interrupted. As a result, an electromotive force (induced voltage) is generated between both ends of the reactor 34 so as to prevent variations in magnetic flux. An induced voltage caused by the magnetic energy accumulated in the reactor 34 becomes a drop voltage where an input voltage of the secondary side is dropped according to a ratio between ON and OFF states of the first switching element 31 of the high side arm, and the drop voltage is applied to the primary side.

The DC-DC converter 13 is driven by a signal (PWM signal) which undergoes the pulse width modulation (PWM), is output from the converter ECU 16 and is input to each of the gates of the switching elements 31 and 32. For example, according to a switching duty (DUTY) which is defined as a ratio of the ON state of the first switching element 31 of the high side arm during one cycle of the PWM signal, ON and OFF states of the first switching element 31 of the high side arm and the second switching element 32 of the low side aim are switched.

Further, the switching duty (DUTY) is, for example, DUTY=T1on/(T1on+T2on) by the ON state duration T1on of the first switching element 31 and the ON state duration T2on of the second switching element 32.

In addition, the first switching element 31 of the high side aim and the second switching element 32 of the low side arm are inhibited from being turned ON at the same time at the time of change between ON and OFF states. In addition, a dead time when the first switching element 31 and the second switching element 32 are turned OFF at the same time is provided.

The fuel cell stack 11 is connected to the second line L2 and the third line L3, via contactors 11a and 11b which are disposed on the positive polarity side and the negative polarity side and switch between connection and disconnection (ON and OFF states) by the integrated ECU 17, and a capacitor 11c.

The battery 12 is connected to the first line L1 and the second line L2, via contactors 12a and 12b which are disposed on the positive polarity side and the negative polarity side and switch between connection and disconnection (ON and OFF states) by the integrated ECU 17, and a current limiting circuit 12c which is disposed on the positive polarity side and of which an operation is controlled by the integrated ECU 17.

Thereby, the fuel cell stack 11 and the battery 12 are connected in series to the junction 18a between the first line L1 and the third line L3, so as to form the battery circuit 18.

In addition, the PDU 21 is connected to the first line L1 and the third line L3 such that power is output to the motor 22 which is a load from the first line L1 and the third line L3.

In addition, the air pump inverter 14 which is a driving circuit of the air pump 23 is connected to the first line L1 and the second line L2.

The PDU 21 forming a driving circuit of the three-phase motor 22 includes, for example, a PWM inverter using a pulse width modulation (PWM) and includes a three-phase bridge circuit where a plurality of switching elements (for example, IGBT: Insulated Gate Bipolar mode Transistor) are bridge-connected to each other.

In the bridge circuit, for example, a plurality of high side and low side switching elements which are series connected as a pair for each phase are bridge-connected to each other.

This PDU 21 is driven by, for example, a signal (PWM signal) which undergoes the pulse width modulation (PWM), is output from a motor ECU (not shown) and is input to each of gates of the switching elements of the bridge circuit. For example, when the motor 22 is driven, ON (conduction) and OFF (interruption) states of each of the transistors forming a pair for each phase are switched. Thereby, DC power output from the power supply apparatus 10 is converted into three-phase AC power. A current sequentially flows through three-phase stator windings (not shown) of the motor 22, and thereby AC U phase current Iu, V phase current Iv, and W phase current Iw respectively flow through the stator windings of the respective phases. On the other hand, for example, when the motor 22 is regenerated, three-phase AC power output from the motor 22 is converted into DC power so as to be supplied to the DC-DC converter 13, thereby charging the battery 12 and supplying power to the load connected to the DC-DC converter 13.

In addition, the motor ECU receives, for example, detection signals from the respective sensors such as a phase current sensor (not shown) which detects each phase current of three phases between the PDU 21 and the motor 22, and an angle sensor (not shown) which detects a rotation angle (that is, a rotation angle of the magnetic pole of a rotor from a predetermined reference rotation position and a rotation position of the rotation axis of the motor 22) of the rotor of the motor 22.

In addition, the motor 22 is a permanent magnet type three-phase AC synchronous motor using, for example, a permanent magnet as a field magnet. When driving is controlled by the three-phase AC power supplied from the PDU 21, and a driving force is delivered from the driving wheel side to the motor 22 side when the vehicle is decelerated, the motor 22 functions as a generator so as to generate a so-called regenerative braking force, and recovers the kinetic energy of the vehicle body as electric energy.

The converter ECU 16 controls an operation of the DC-DC converter 13 in cooperation with the integrated ECU 17.

In addition, the integrated ECU 17 receives, for example, detection signals output from the respective sensors such as a current sensor 41 which detects a current flowing through the reactor 34 (reactor current IL) and an output current sensor 43 which detects an output current Ifc from the fuel cell stack 11.

Figure 2:
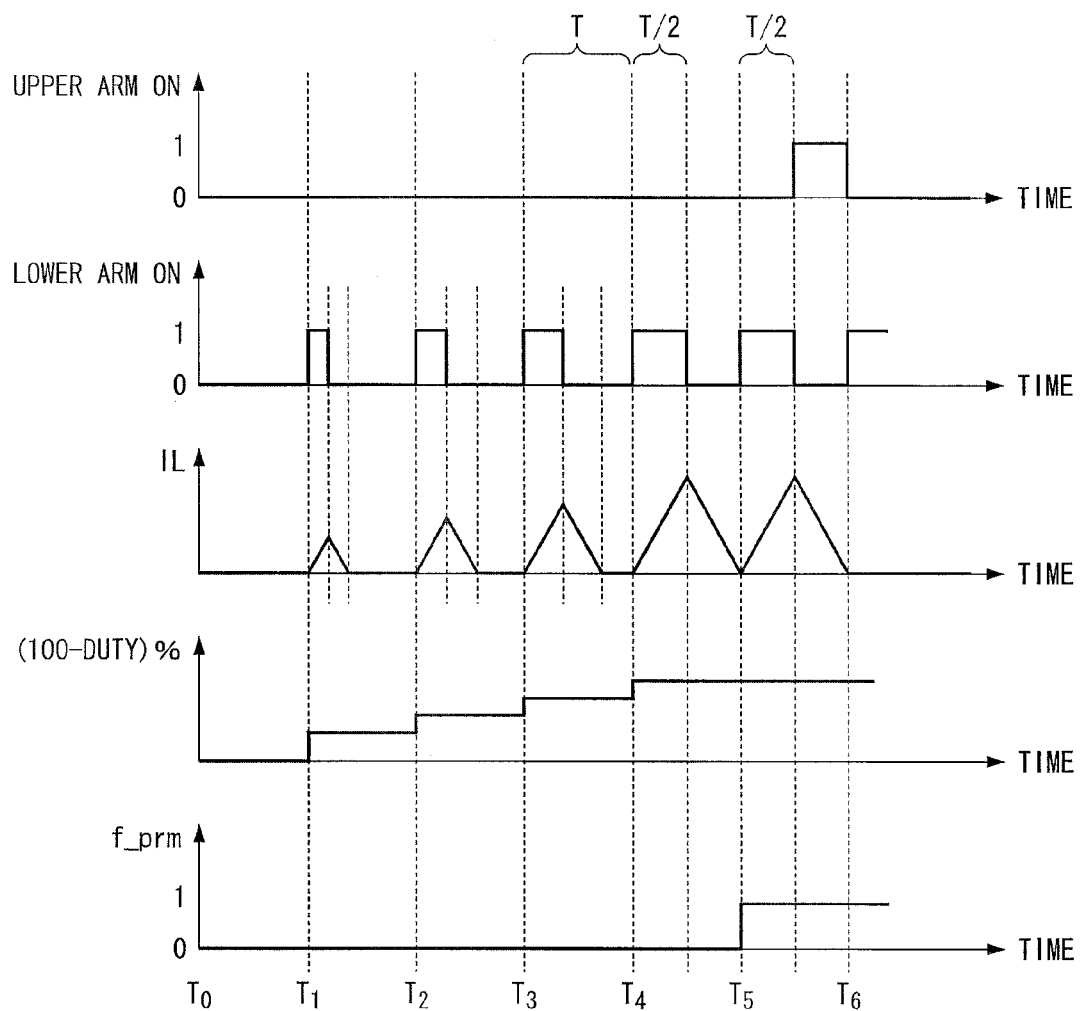
FIG. 2 is a diagram illustrating an example of the upper atm ON state duration, the lower arm ON state duration, the reactor current IL, the switching duty (DUTY), and the gate output permission flag f_prm in a case where the one-side switching mode is executed when the power supply apparatus is activated.

The converter ECU 16 executes the one-side switching mode where, while the ON state of the first switching element 31 (the upper arm ON state) is inhibited, only the second switching element 32 is alternately turned ON and OFF, when the power supply apparatus 10 is activated. In the one-side switching mode, for example, as shown in FIG. 2, the ON state duration T2on (lower arm ON state duration) of the second switching element 32 is changed so as to have a tendency to become further from zero for each predetermined switching cycle T.

In addition, the converter ECU 16 changes the ON state duration T2on of the second switching element 32 by changing, for example, switching duty (DUTY), and gradually changes the switching duty (DUTY) so as to have a tendency to be decreased from 100% corresponding to zero of the ON state duration T2on (lower arm ON state duration).

In this one-side switching mode, during a time period when the first switching element 31 is turned OFF (inhibition of the upper arm ON state), the second switching element 32 is turned ON (execution of the lower arm ON state), and the reactor 34 is DC-excited, the reactor current IL monotonically increases. In addition, during a time period when the first switching element 31 and the second switching element 32 are turned OFF, and magnetic energy accumulated in the reactor 34 is consumed, the reactor current IL monotonically decreases. Thereby, the reactor current IL has a triangular waveform in (for example, an isosceles triangular waveform (the time period when the reactor 34 is DC-excited is the same as the time period when the magnetic energy of the reactor 34 is consumed)).

Since the ON state duration T2on of the second switching element 32 (the lower arm ON state duration) becomes longer for each of the switching cycles T which are sequentially repeated, the maximum value of the reactor current IL of the triangular waveform (a current value at the peak of the triangular wave) is changed so as to have a tendency to be increased.

The integrated ECU 17 acquires a detection result of the reactor current IL which is detected by the current sensor 41 at a predetermined cycle from the current sensor 41 when the one-side switching mode is executed, and transmits the detection result of the reactor current IL to the converter ECU 16.

Figure 3:
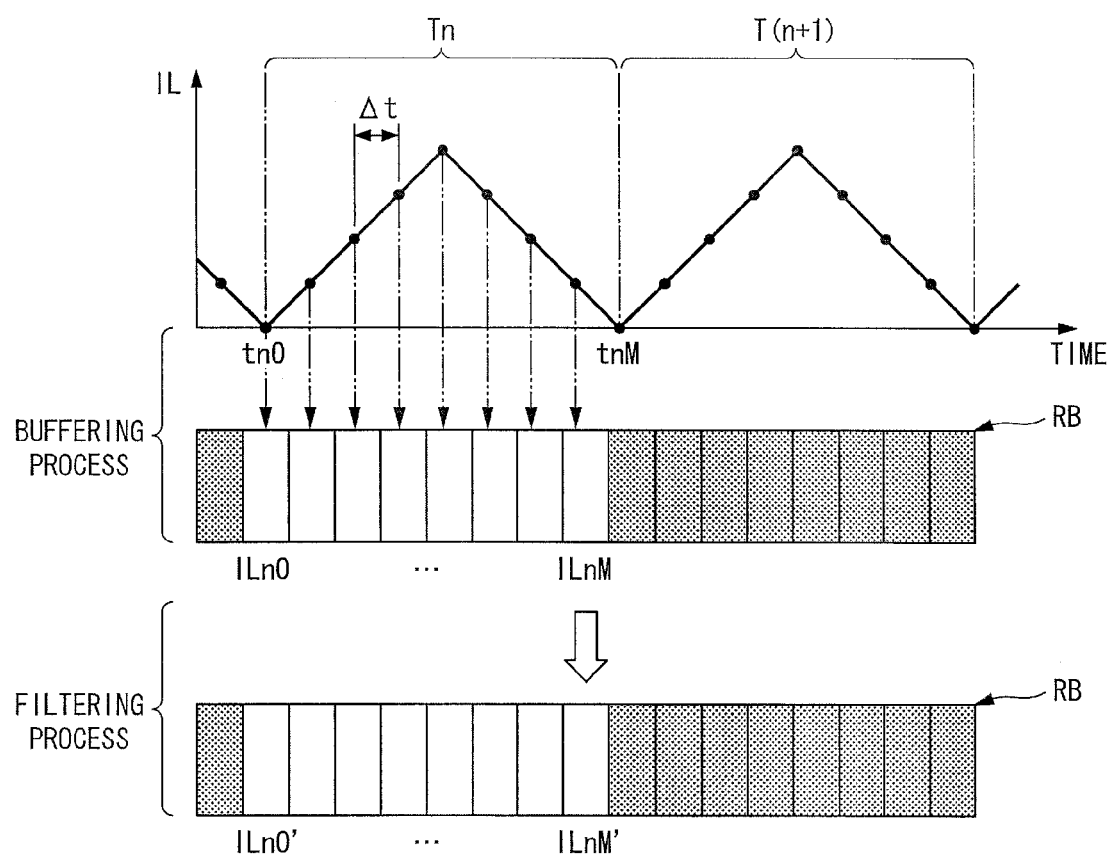
FIG. 3 is a diagram illustrating an example of the time series data of the reactor current IL within each switching cycle T in a case where the one-side switching mode is executed when the power supply apparatus is activated.

The converter ECU 16 executes a buffering process and a filtering process for the reactor current IL received from the integrated ECU 17, for example, as shown in FIG. 3.

As the buffering process, the converter ECU 16 stores time series data of the reactor currents IL which are sequentially received from the integrated ECU 17, for example, for each of predetermined switching cycles T within the switching cycle T, in a storage unit such as a ring buffer independently for each piece of data.

For example, in the buffering process shown in FIG. 3, at each of time points tn0, . . . , tnM (where n and M are any natural numbers) for each predetermined cycle $\Delta t$ within the n-th switching cycle T(n), reactor currents ILn0, . . . , ILnM which are sequentially received from the integrated ECU 17 are stored in the ring buffer RB independently from each other.

In addition, the converter ECU 16 independently executes a predetermined filtering process for each piece of data stored in the storage unit.

For example, in the filtering process shown in FIG. 3, the filtering process is executed for the respective reactor currents ILn0, . . . , ILnM independently, and the respective reactor currents ILn0', . . . , ILnM' which are obtained by the filtering process are newly stored in the ring buffer RB independently.

The converter ECU 16 determines whether or not the reactor current IL continuously flows within the switching cycle T on the basis of the time series data of the reactor current IL obtained by executing the filtering process. If the determination result is "YES", "1" is set as a flag value of the continuity determination flag f_jdg. In addition, in this determination process, for example, in a single switching cycle T, in a case where a terminal end of the reactor current IL of the triangular waveform matches an end of the switching cycle T, in other words, in a case where a turning-ON or OFF timing of the second switching element 32 and the rising or falling timing of the reactor current IL are synchronized with the switching cycle T, and the reactor current IL monotonically increases while the second switching element 32 is turned ON at a time period (T/2) of half the switching cycle T, it is determined that the reactor current IL continuously flows within the switching cycle T.

In a case where "1" is set as a flag value of the continuity determination flag f_jdg in a predetermined number of continuous switching cycles T, "1" is set as a flag value of the gate output permission flag f_prm indicating permission of an output of the gate signal for instructing turning-ON of the first switching element 31.

If the flag value of the gate output permission flag f_prm is "1", the converter ECU 16 permits the ON state of the first switching element 31 (the upper arm ON state), that is, permits execution of the alternating switching mode to be started, thereby stopping the execution of the one-side switching mode and starting the execution of the alternating switching mode. In addition, the integrated ECU 17 executes a feedback process of the current on the basis of a detection result of the reactor current IL output from the current sensor 41 such that the reactor current IL converges on zero.

Figure 4:
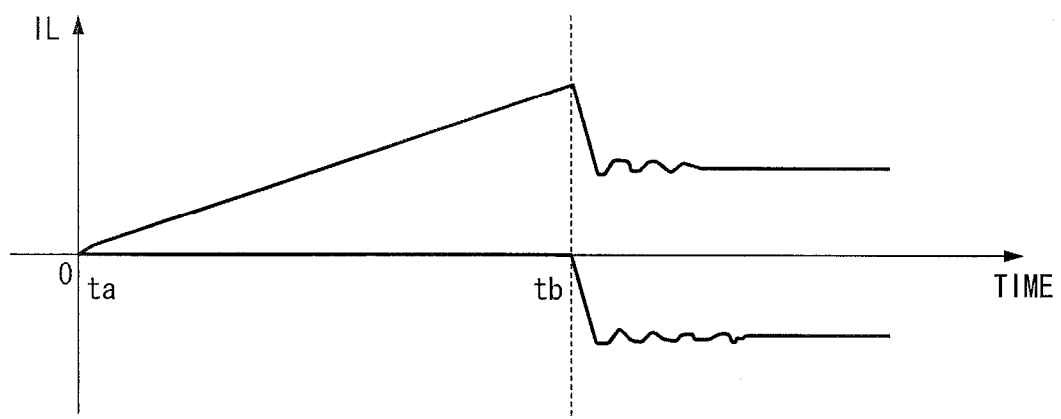
FIG. 4 is a diagram illustrating an example of the variation in the reactor current IL in a case where the one-side switching mode is executed and in a case where the alternating switching mode is executed when the power supply apparatus is activated.
Figure 4:
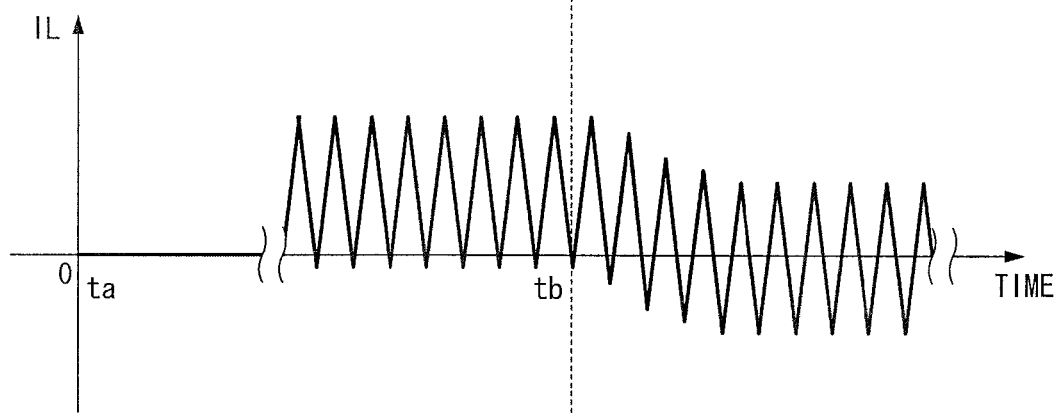

Thereby, for example, as shown in FIG. 4, after the time point to when the one-side switching mode starts to be executed, the reactor current IL is changed so as to have a tendency to be increased according to a decrease in the switching duty (DUTY) (that is, an increase in the ON state duration T2 (lower arm ON state duration) of the second switching element 32)). In addition, after tb when the one-side switching mode is stopped and the alternating switching mode starts to be executed, an effective value of the reactor current IL converges on zero in response to the feedback process of the current.

The integrated ECU 17 calculates total power consumption of the load which is supplied with power from the power supply apparatus 10 as a normal operation of the power supply apparatus 10 during the execution of the alternating switching mode. In addition, for example, when the motor 22 is driven, on the basis of a state of the fuel cell stack 11 (for example, a variation rate of the state change of the fuel cell stack 11 responding to a power generation command) and a remaining capacity SOC of the battery 12, a power distribution between the fuel cell stack 11 and the battery 12 forming the battery circuit 18 of the power supply apparatus 10, that is, a target value of the distribution (target power distribution) when the total power consumption of the load uses a value obtained by adding power output from the fuel cell stack 11 and power output from the battery 12 is set.

For example, the power distribution when the motor 22 is driven becomes a value according to the switching duty (that is, a ratio of the ON state of the switching element of the high side arm during one cycle of the PWM signal) of the DC-DC converter 13, and, the switching duty (DUTY) is described by a voltage VFC (V1) between the terminals of the fuel cell stack 11 and a voltage VB (V2) between the terminals of the battery 12, for example, as shown in the following Expression (1).

$$\mathrm{DUTY}(\%)=100\times V1/(V1+V2) \quad [\text{Expression 1}]$$

Thereby, for example, as shown in the following Expression (2), a ratio between the voltage VFC (V1) between the terminals of the fuel cell stack 11 and the voltage VB (V2) between the terminals of the battery 12 is described using the switching duty (DUTY).

$$V2/V1=(100-\mathrm{DUTY})/\mathrm{DUTY} \quad [\text{Expression 2}]$$

Figure 5A:
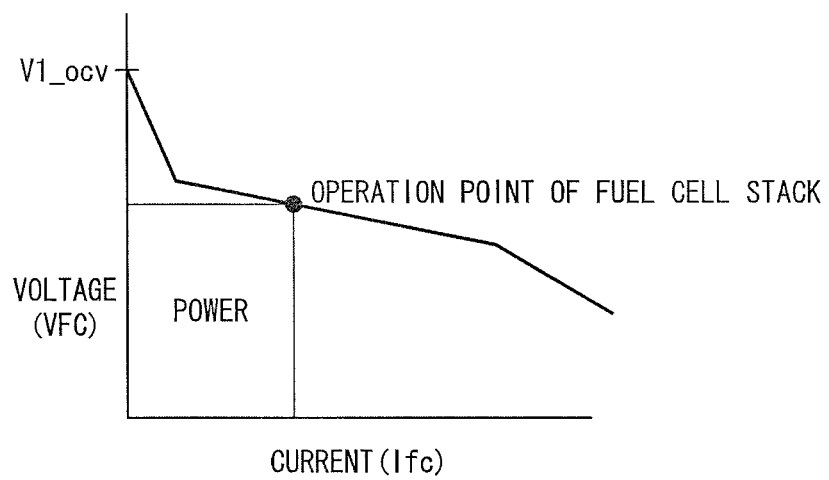
FIG. 5A is a diagram illustrating an example of the operation point of the fuel cell stack.
Figure 5B:
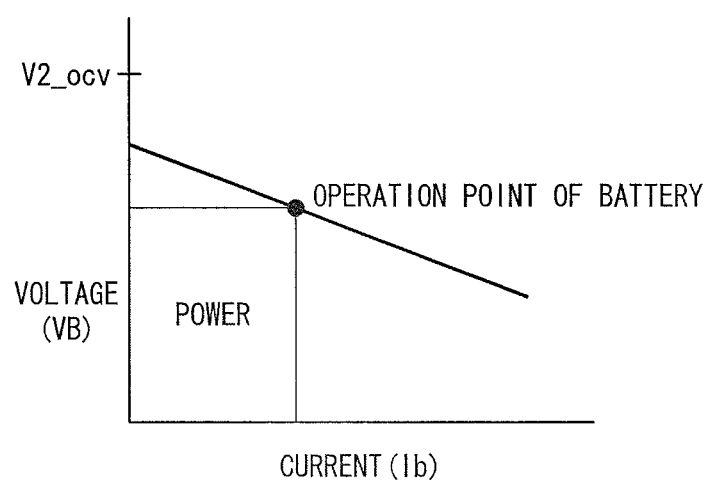
FIG. 5B is a diagram illustrating an example of the operation point of the battery.

The voltage VFC (V1) between the terminals of the fuel cell stack 11 and the voltage VB (V2) between the terminals of the battery 12, for example, as shown in FIGS. 5A and 5B, respectively have predetermined correspondence relationships with a current (output current Ifc) and power of the fuel cell stack 11 and a current (Ib) and power of the battery 12. Thereby, a ratio between an operation point (for example, voltage, current or power) of the fuel cell stack 11 and an operation point (for example, voltage, current or power) of the battery 12 is described using the switching duty (DUTY).

In addition, for example, when the motor 22 is regenerated, the integrated ECU 17 sets a power distribution on the power supply side between the fuel cell stack 11 and the PDU 21 and a power distribution on the power reception side between the battery 12 and the load on the basis of a state of the fuel cell stack 11 (for example, a variation rate or the like of the state change of the fuel cell stack 11 responding to a power generation command), a remaining capacity SOC of the battery 12, regenerative power of the motor 22, and the like.

For example, when the motor 22 is driven, a ratio between an operation point (for example, voltage, current or power) of the fuel cell stack 11 and an operation point (for example, voltage, current or power) of the battery 12 is described using the switching duty (DUTY). The integrated ECU 17 acquires a target current for the output current Ifc of the fuel cell stack 11 by referring to a predetermined map indicating correspondence relationships between the operation point of the fuel cell stack 11 and the operation point of the battery 12, and the switching duty (DUTY) of the DC-DC converter 13 and the total power consumption of the load.

In addition, for example, when the motor 22 is regenerated, the integrated ECU 17 outputs 0 or a positive value as the target current of the current (the output current Ifc) of the fuel cell stack 11 depending on each power distribution.

Further, the integrated ECU 17 performs, for example, feedback processes including a PID (Proportion Integration Differentiation) operation, such that an actual power distribution (actual power distribution) between the fuel cell stack 11 and the battery 12 matches the target power distribution, for example, a detection value of the output current Ifc of the fuel cell stack 11 output from the output current sensor 43 matches the target current of the output current Ifc. In addition, a signal of the calculation result of the feedback processes is transmitted to the converter ECU 16.

The converter ECU 16 generates a gate signal (that is, a PWM signal) for turning ON and OFF the respective switching elements 31 and 32 of the DC-DC converter 13 so as to control a switching duty of the DC-DC converter 13 in response to the signal received from the integrated ECU 17. In addition, synchronous switching is performed in the DC-DC converter 13 by the gate signal.

Figure 6:
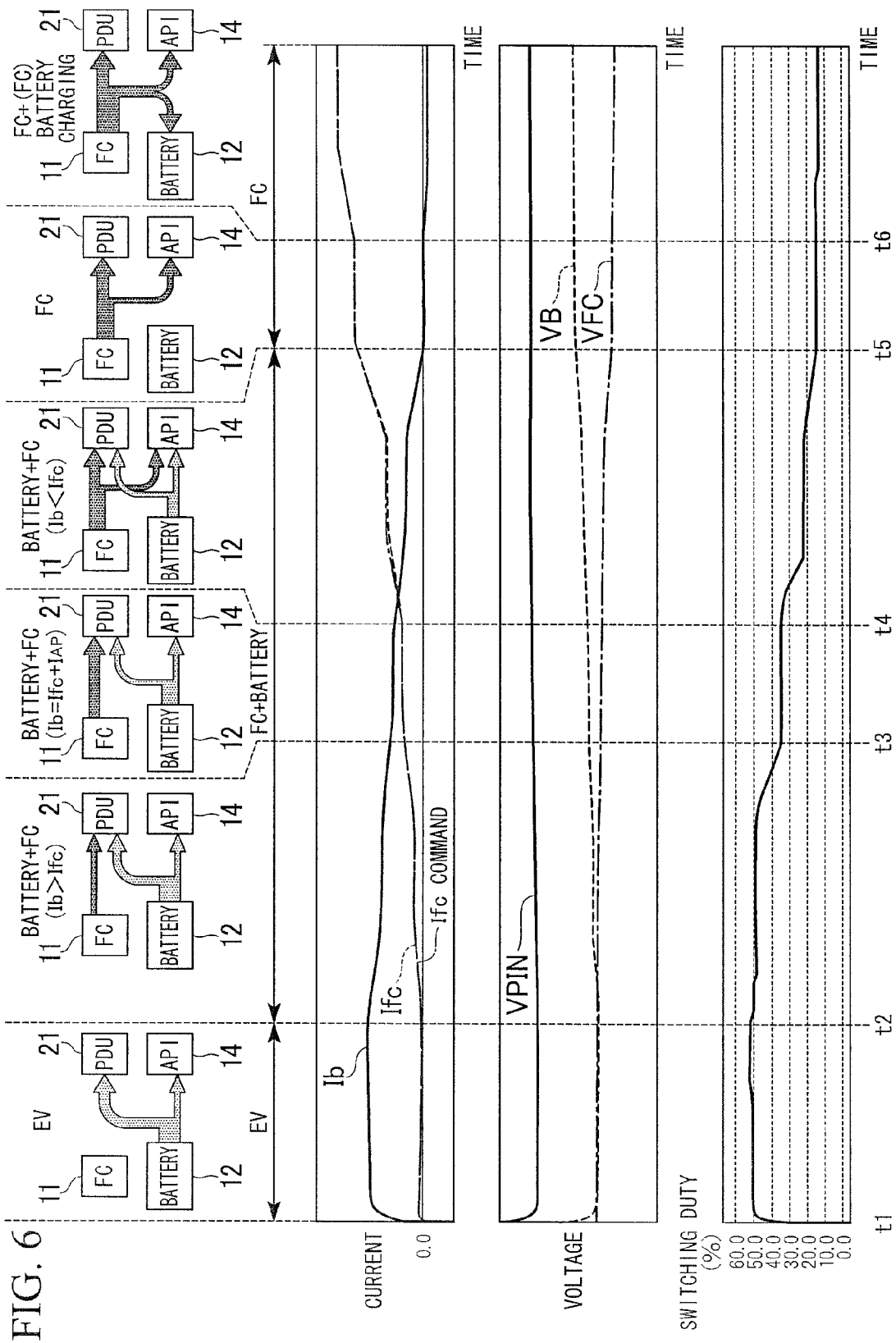
FIG. 6 is a diagram illustrating an example of the variation in the operation modes of the power supply apparatus and the variation in the current and the voltage of the fuel cell stack and the battery according to the variation in the switching duties when the driving motor is driven.

Thereby, for example, as shown in FIG. 6, an operation mode of the power supply apparatus 10 is continuously controlled.

For example, in a state where a boosting ratio of the first DC-DC converter 13 is a value of about 2 to 3, an operation mode of the power supply apparatus 10 where the switching duty becomes the maximum is an EV mode where only the output of the battery 12 is supplied to the PDU 21 and the air pump inverter (API) 14, for example, as shown in the time period of the time point t1 to the time point t2.

According to the switching duty being changed so as to have a tendency to be decreased from the EV mode, an operation mode of the power supply apparatus 10 sequentially transitions to first to third (FC+battery) modes, for example, as shown in the time period of the time point t2 to the time point t5.

In the first (FC+battery) mode, the output of the battery 12 is supplied to the PDU 21 and the air pump inverter 14 and the output of the fuel cell stack 11 is supplied to the PDU 21, and thus the current (Ib) of the battery 12 becomes larger than the current (output current Ifc) of the fuel cell stack 11.

In the second (FC+battery) mode, the output of the battery 12 is supplied to the PDU 21 and the air pump inverter 14 and the output of the fuel cell stack 11 is supplied to the PDU 21, and thus the current (Ib) of the battery 12 becomes the same as a sum of the current (output current Ifc) of the fuel cell stack 11 and a current (IAP) flowing through the air pump inverter 14.

In the third (FC+battery) mode, the outputs of the battery 12 and the fuel cell stack 11 are supplied to the PDU 21 and the API 14, and thus a current (Ib) of the battery 12 becomes smaller than the current (output current Ifc) of the fuel cell stack 11.

Thereby, the current (Ib) of the battery 12 is changed so as to have a tendency to be decreased, and the current (output current Ifc) of the fuel cell stack 11 and the target current (Ifc command) are changed so as to have a tendency to be increased. In addition, the input voltage (VPIN) on the primary side of the PDU 21 is maintained to be nearly constant, the voltage (VB) of the battery 12 is changed so as to have a tendency to be increased, and the voltage (VFC) of the fuel cell stack 11 is changed so as to have a tendency to be decreased.

In addition, according to the switching duty being changed so as to have a tendency to be decreased to the minimum from the third (FC+battery) mode, an operation mode of the power supply apparatus 10 sequentially transitions to the first and second FC modes, for example, as shown in the time point t5 and thereafter.

In the first FC mode, only the output of the fuel cell stack 11 is supplied to the PDU 21 and the API 14.

In the second FC mode, only the output of the fuel cell stack 11 is supplied to the PDU 21, the API 14, and the battery 12, and thus the battery 12 is charged.

Thereby, the current (Ib) of the battery 12 is changed so as to have a tendency to be decreased to a positive value from 0, and the current (output current Ifc) of the fuel cell stack 11 and the target current (Ifc command) are changed so as to have a tendency to be increased. In addition, the input voltage (VPIN) on the primary side of the PDU 21 is maintained to be nearly constant, the voltage (VB) of the battery 12 is changed so as to have a tendency to be increased, and the voltage (VFC) of the fuel cell stack 11 is changed so as to have a tendency to be decreased.

Further, for example, when the motor 22 is regenerated, the integrated ECU 17 performs a feedback control such that a detection value of the current (output current Ifc) of the fuel cell stack 11 matches the target current (0 or a positive value), and controls the switching duty of the DC-DC converter 13 by performing a feedback control of the regenerative voltage.

For example, an operation mode of the power supply apparatus 10 where a target current of the current (output current Ifc) of the fuel cell stack 11 is 0 becomes a regeneration mode where the battery 12 is charged by the regenerative power of the PDU 21.

In addition, for example, an operation mode of the power supply apparatus 10 where a target current of the current (output current Ifc) of the fuel cell stack 11 is a positive value becomes a mode where the regenerative power of the PDU 21 and the output of the fuel cell stack 11 are supplied to the API 14 and the battery 12, and thereby the battery 12 is charged (regeneration+battery charging by FC).

In addition, the integrated ECU 17 outputs command values for pressure and flow rate of a reaction gas supplied to the fuel cell stack 11 as a power generation command for the fuel cell stack 11, thereby controlling a power generation state of the fuel cell stack 11, on the basis of, for example, a driving state of the fuel cell vehicle, the concentration of hydrogen included in a reaction gas supplied to the anode of the fuel cell stack 11, the concentration of hydrogen included in an exhaust gas exhausted from the anode of the fuel cell stack 11, and a power generation state of the fuel cell stack 11, for example, a voltage between the terminals of each of a plurality of fuel battery cells, the voltage VFC of the fuel cell stack 11, the output current Ifc of the fuel cell stack 11, internal temperature of the fuel cell stack 11, and the like.

In addition, the integrated ECU 17 switches ON and OFF states of the respective contactors 11a and 11b in response to the power generation state of the fuel cell stack 11, so as to control connection between the fuel cell stack 11, and the second line L2 and the third line L3.

In addition, the integrated ECU 17 switches ON and OFF states of the respective contactors 12a and 12b and the current limiting circuit 12c depending on a remaining capacity SOC of the battery 12, so as to control connection between the battery 12, and the first line L1 and the second line L2.

The power supply apparatus 10 according to the present embodiment has the above-described configuration, and, next, an operation of the power supply apparatus 10, particularly, an activating method of the power supply apparatus 10 will be described.

Figure 7:
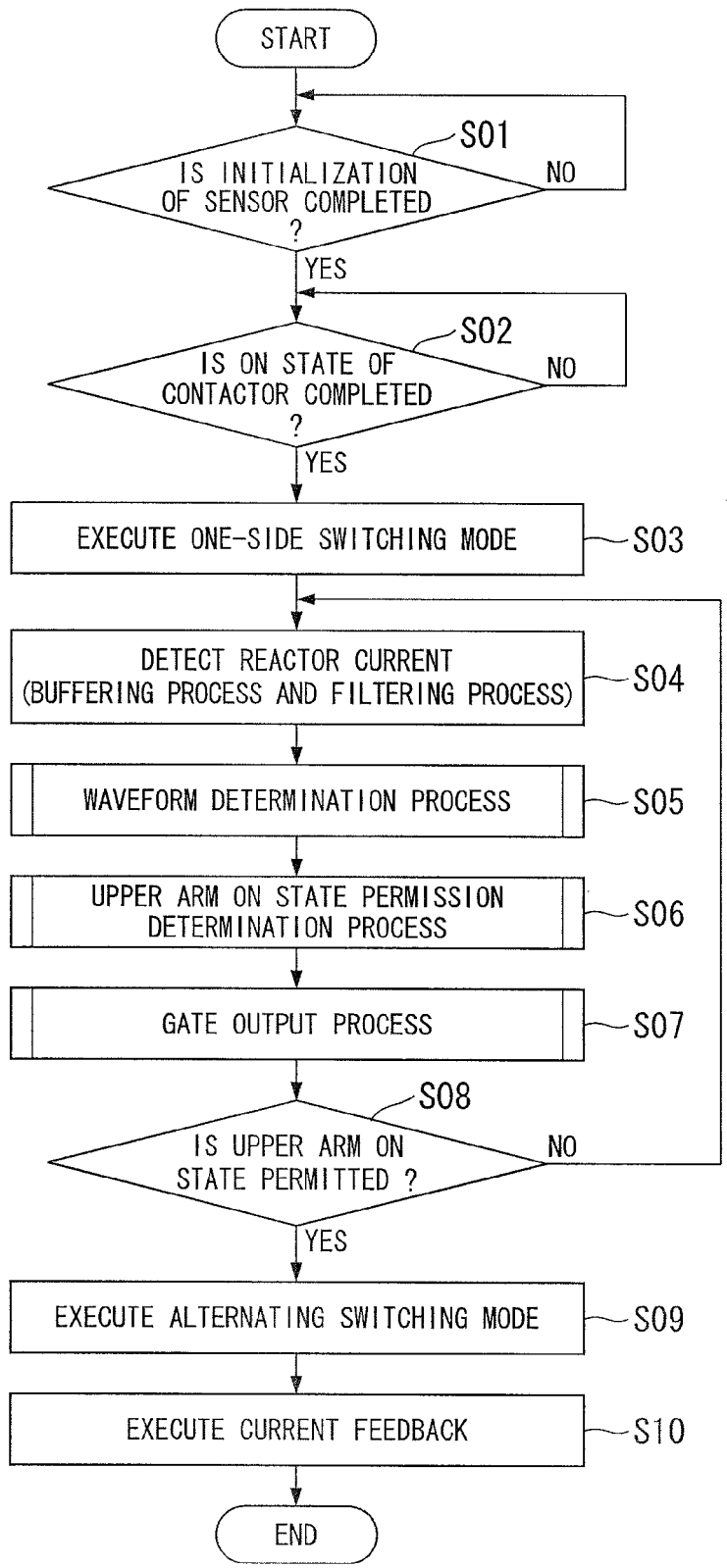
FIG. 7 is a flowchart illustrating a power supply apparatus activating method.

First, for example, in step S01 shown in FIG. 7, the current limiting circuit 12c of the battery 12 is in a connection state as a precharge operation, and thereby a current is made to flow through the smoothing capacitor 35.

In addition, as an initialization determination process, it is determined whether or not "1" is set as a flag value of the sensor initialization completion flag indicating that initialization of each sensor of the current sensor 41 detecting the current (reactor current IL) flowing through the reactor 34, the output current sensor 43 detecting the output current Ifc of the fuel cell stack 11, and the like is completed.

If the determination result is "NO", the initialization determination process in step S01 is repeatedly executed.

On the other hand, if the determination result is "YES", the flow proceeds to step S02.

Next, in step S02, it is determined whether or not "1" is set as a flag value of the contactor ON state completion flag indicating that the respective contactors 11a and 11b of the fuel cell stack 11 and the respective contactors 12a and 12b and the current limiting circuit 12c of the battery 12 are in a connection state.

If the determination result is "NO", the determination process in step S02 is repeatedly executed.

On the other hand, if the determination result is "YES", the flow proceeds to step S03.

Next, in step S03, the one-side switching mode starts to be executed such that only the second switching element 32 is alternately turned ON and OFF while the ON state of the first switching element 31 (the upper arm ON state) is inhibited, using a predetermined initial value of the switching duty (DUTY) (for example, 100% or the like corresponding to zero of the ON state duration T2 of the second switching element 32 (the lower arm ON state duration)).

Next, in step S04, the current sensor 41 detects the current (reactor current IL) flowing through the reactor 34, and a buffering process and a filtering process are performed for this detection result.

Next, in step S05, a waveform determination process described later is executed on the basis of the respective reactor currents IL (for example, the reactor currents ILn0', ..., ILnM') which are obtained through the buffering process and the filtering process.

Next, in step S06, an upper arm ON state permission determination process described later is executed.

Next, in step S07, a gate output process described later is executed.

Next, in step S08, it is determined whether or not the ON state of the first switching element 31 (the upper arm ON state) is permitted, that is, the alternating switching mode is permitted to start to be executed.

If the determination result is "NO", the flow returns to step S04 described above.

On the other hand, if the determination result is "YES", the flow proceeds to step S09.

In step S09, the execution of the one-side switching mode is stopped, and the alternating switching mode starts to be executed.

In step S10, when the alternating switching mode is executed, a feedback process is performed for a current such that the reactor current IL converges on zero on the basis of a detection result of the reactor current IL output from the current sensor 41, and the flow proceeds to end.

Hereinafter, the waveform determination process in step S05 described above will be described.

Figure 8:
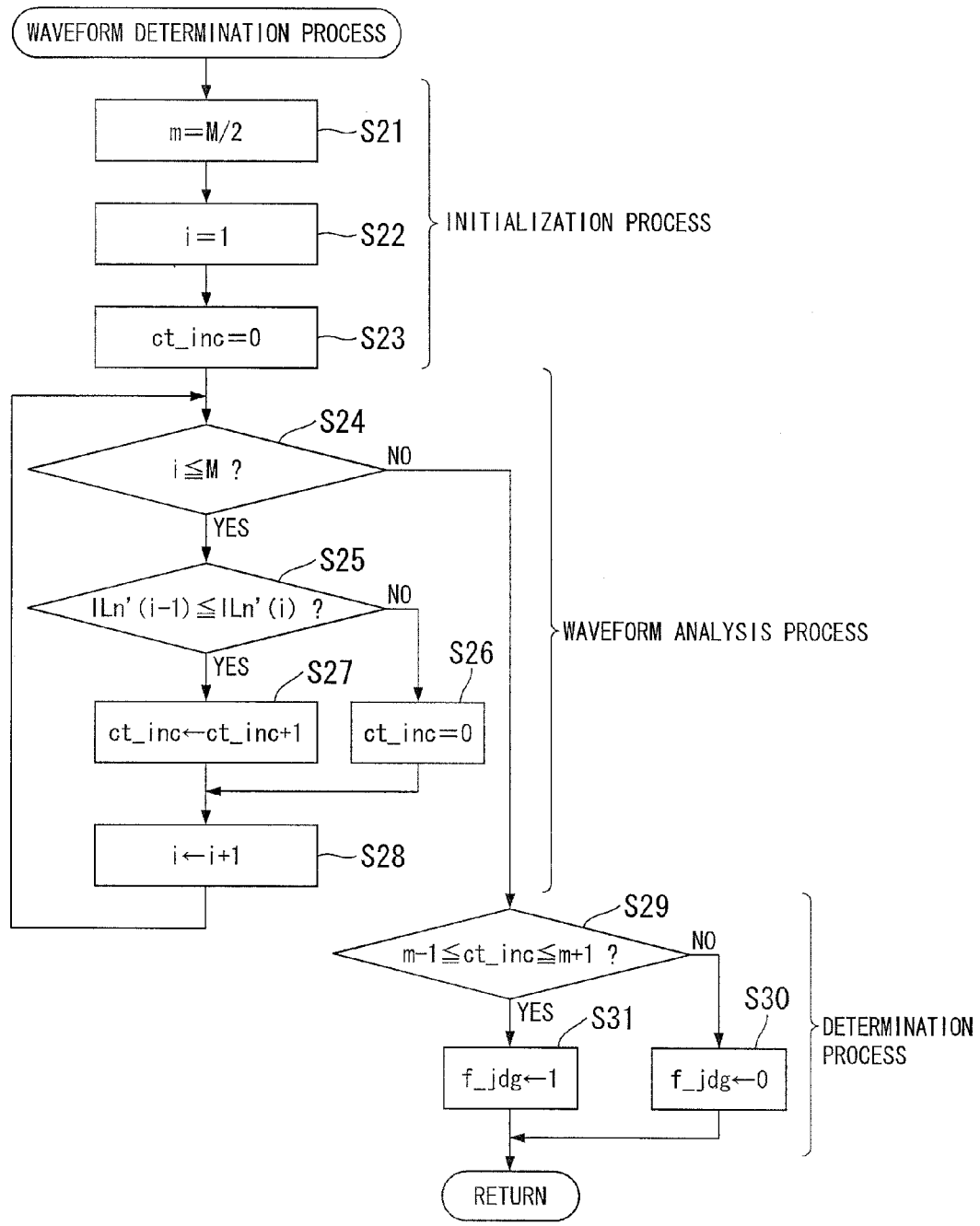
FIG. 8 is a flowchart illustrating the waveform determination process shown in FIG. 7.

First, for example, as an initialization process shown in FIG. 8, in step S21, by the use of the number of detections M (that is, the number of time series data of the reactor current IL for each switching cycle T) of the reactor current IL by the current sensor 41 within a predetermined switching cycle T, the number of detections m=M/2 of the reactor current IL by the current sensor 41 at a half cycle of the switching cycle T is calculated.

Next, in step S22, "1" is set as the parameter i of an arbitrary natural number, thereby initializing the parameter i.

Next, in step S23, "0" is set as the number of data ct_int where the reactor current IL is changed so as to have a tendency to be continuously increased with the passage of time in the time series data of the reactor current IL, thereby initializing the number of data ct_int.

Next, as a waveform analysis process, in step S24, it is determined whether or not the parameter i is equal to or less than the number of detections M.

If the determination result is "YES", the flow proceeds to step S25.

On the other hand, if the determination result is "NO", the flow proceeds to step S29 described later.

Next, in step S25, it is determined whether or not the (i−1)-th reactor current ILn'(i−1) is equal to or less than the i-th reactor current ILn'(i) in the time series data of the reactor current IL.

If the determination result is "YES", the flow proceeds to step S25, and, in step S25, the number of data ct_int is incremented.

On the other hand, if the determination result is "NO", the flow proceeds to step S26, and, in step S26, the number of data ct_int is set as zero.

In step S28, the parameter i is incremented.

Next, as a determination process, in step S29, it is determined whether or not the number of data ct_int is equal to or more than (m−1) and equal to or less than (m+1).

If the determination result is "NO", a flag value of the continuity determination flag f_jdg is set to "0", and the flow proceeds to return.

On the other hand, if the determination result is "YES", it is determined that the reactor current IL monotonically increases during the half cycle of the switching cycle T, and, the flow proceeds to step S31. In step S31, a flag value of the continuity determination flag f_jdg is set to "1", and the flow proceeds to return.

Hereinafter, the upper arm ON state permission determination process in step S06 described above will be described.

Figure 9:
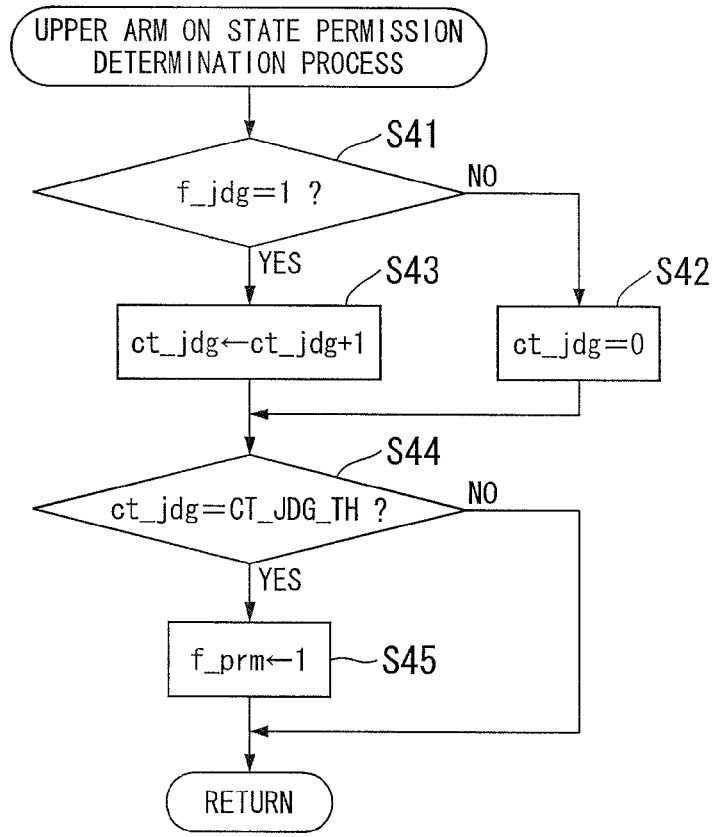
FIG. 9 is a flowchart illustrating the upper arm ON state permission determination process shown in FIG. 7.

First, for example, in step S41 shown in FIG. 9, it is determined whether or not the flag value of the continuity determination flag f_jdg is set to "1".

If the determination result is "NO", the flow proceeds to step S42, and, in step S42, the number of continuity determinations ct_jdg is set to zero.

If the determination result is "YES", the flow proceeds to step S43, and, in step S43, the number of continuity determinations ct_jdg is incremented.

In step S44, it is determined whether or not the number of continuity determinations ct_jdg reaches a predetermined determination threshold value CT_JDG_TH.

If the determination result is "NO", the flow proceeds to return.

On the other hand, if the determination result is "YES", the flow proceeds to step S45, and, in step S45, a flag value of the gate output permission flag f_prm is set to "1". Then, the flow proceeds to return.

Hereinafter, the gate output process in step S07 described above will be described.

Figure 10:
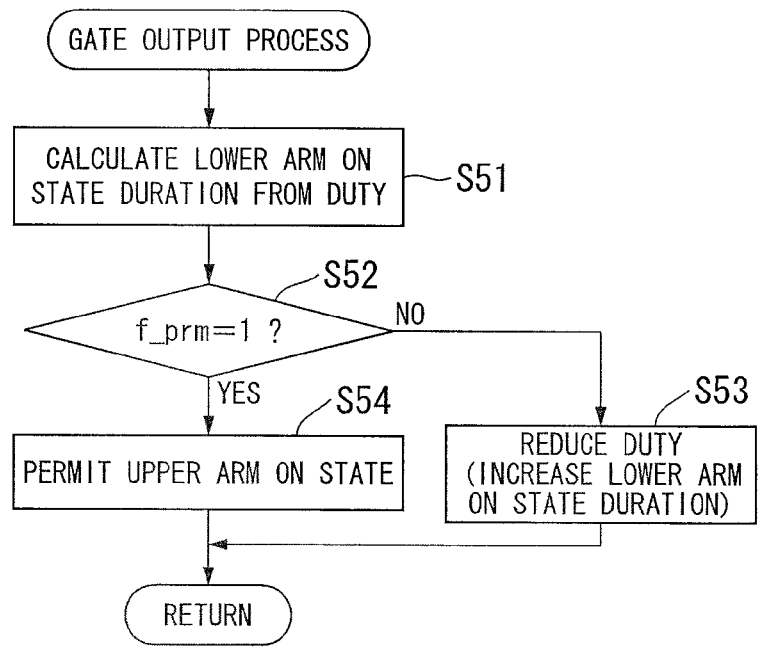
FIG. 10 is a flowchart illustrating the gate output process shown in FIG. 7.

First, for example, in step S51 shown in FIG. 10, the ON state duration T2on of the second switching element 32 (lower arm ON state duration) is calculated from the switching duty (DUTY).

Next, in step S52, it is determined whether or not a flag value of the gate output permission flag f_prm is set to "1".

If the determination result is "NO", the flow proceeds to step S53, and, in step S53, the switching duty (DUTY) is reduced by a predetermined value, thereby increasing the lower arm ON state duration by a predetermined duration. Then, the flow proceeds to return.

On the other hand, if the determination result is "YES", the flow proceeds to step S54, and, in step S54, the ON state of the first switching element 31 (the upper arm ON state) is permitted. Then, the flow proceeds to return.

As described above, according to the activating method of the power supply apparatus 10 in the embodiment related to the present invention, the one-side switching mode is executed before executing the alternating switching mode, thereby the first switching element 31 is turned OFF, the second switching element 32 is turned ON, and the reactor 34 is DC-excited. Thereby, even if the first switching element 31 is turned ON and the second switching element 32 is turned OFF in the alternating switching mode, it is possible to prevent an excessive current from flowing from the fuel cell stack 11 or the battery 12. In addition, it is possible to prevent the switching elements 31 and 32 from being damaged by the excessive current.

For example, as shown in FIG. 1, in a normal state where the motor 22 is driven, in relation to the respective currents IL, Ic1, Ic2, Imot, Ifc and Ib flowing through the respective portions of the power supply apparatus 10, it is possible to prevent the first switching element 31 from being damaged by such an excessive current as reversely flows through the second switching element 32 and the reactor 34.

In addition, it is possible to simplify an apparatus configuration without necessity for the respective voltage sensors for detecting the voltage VFC (V1) between the terminals of the fuel cell stack 11 and the voltage VB (V2) between the terminals of the battery 12 when the power supply apparatus 10 is activated.

Further, in a case where the reactor current IL continuously flows within the switching cycle T in the one-side switching mode, that is, there is no time period when the reactor current IL becomes zero within the switching cycle T, even if the first switching element 31 is turned ON and the second switching element 32 is turned OFF, an output voltage of the battery circuit 18 balances a voltage of the secondary side of the DC-DC converter 13. Thereby, it is possible to prevent an unintended excessive current from flowing in the circuit system, and to thereby stably perform a switching transfer from the one-side switching mode to the alternating switching mode.

Further, when the one-side switching mode is executed, a terminal end of the reactor current IL of the triangular waveform matches an end of the switching cycle T, it can be determined that the reactor current IL continuously flows within the switching cycle T. Therefore, it is possible to prevent an unintended excessive current from flowing in the circuit system, and to thereby stably perform a switching transfer from the one-side switching mode to the alternating switching mode.

In addition, the second switching element 32 can switch between the ON state and the OFF state every time period (T/2) of half the switching cycle T while the first switching element 31 is maintained in the OFF state. Therefore, in a case where the reactor current IL has an isosceles triangular waveform, the reactor current IL is detected only during the time period (T/2) of half the switching cycle T, and thereby it is possible to determine whether or not the reactor current IL continuously flows within the switching cycle T. Thereby, it can be promptly determined whether or not a switching transfer to the alternating switching mode from the one-side switching mode is possible.

In addition, it is possible to switch between a plurality of operation modes simply by providing the single DC-DC converter 13 for the battery circuit 18 where the fuel cell stack 11 and the battery 12 are connected in series to each other. Therefore, it is possible to reduce costs necessary for the configuration and miniaturize the size thereof, as compared with, for example, a case where a DC-DC converter is separately provided for each of the fuel cell stack 11 and the battery 12.

In addition, although, in the above-described embodiment, the battery 12 is connected to the first line L1 and the second line L2, and the fuel cell stack 11 is connected to the second line L2 and the third line L3, the present invention is not limited thereto. The fuel cell stack 11 may be connected to the first line L1 and the second line L2, and the battery 12 may be connected to the second line L2 and the third line L3.

Further, although, in the above-described embodiment, the integrated ECU 17 performs a feedback process such that an actual power distribution between the fuel cell stack 11 and the battery 12 matches the target power distribution, for example, a detection value of the current (output current Ifc) of the fuel cell stack 11 matches the target current, thereby controlling the switching duty of the DC-DC converter 13, the present invention is not limited thereto. For example, the feedback control may be performed such that the current (Ib) of the battery 12 matches a target value instead of the current (output current Ifc) of the fuel cell stack 11. Further, the feedback control may be performed such that a detection value of the voltage (VFC) of the fuel cell stack 11 or the voltage (VB) of the battery 12 matches a target value instead of the current, or the feedback control may be performed for the switching duty such that an output ratio of the fuel cell stack 11 and the battery 12 matches a target value.

Further, for example, when the motor 22 is regenerated, the feedback control may be performed such that an output of the fuel cell stack 11 matches a target value instead of the current (output current Ifc) of the fuel cell stack 11.

In addition, although, in the above-described embodiment, the switching circuit 33 of the DC-DC converter 13 is configured by the first and second switching elements 31 and 32 which are connected in series to each other, the present invention is not limited thereto. The switching circuit may be configured by a three-phase bridge circuit (that is, a circuit where a plurality of high side and low side switching elements which are connected in series to each other so as to form a pair for each phase are bridge-connected to each other). In this case, the present invention is not limited to the single reactor 34, and, for example, a reactor may be provided for each phase of three phases.

REFERENCE SIGNS LIST

10 POWER SUPPLY APPARATUS
11 FUEL CELL STACK (FUEL CELL, FIRST POWER SUPPLY)
12 BATTERY (STORAGE DEVICE, SECOND POWER SUPPLY)
13 DC-DC CONVERTER
16 CONVERTER ECU
17 INTEGRATED ECU
18 BATTERY CIRCUIT
21 PDU
31 FIRST SWITCHING ELEMENT
32 SECOND SWITCHING ELEMENT
33 SWITCHING CIRCUIT
34 REACTOR

The invention claimed is:

1. A power supply apparatus activating method, in which the power supply apparatus includes a first line, a second line, and a third line having different potentials so as to have a tendency to be sequentially decreased; a battery circuit where a first power supply and a second power supply are connected in series to each other; and a DC-DC converter formed by a switching circuit where a first switching element and a second switching element respectively having free-wheeling diodes are connected in series to each other, and a reactor, and in which two ends of the battery circuit are connected to the first line and the third line, a junction between the first power supply and the second power supply of the battery circuit is connected to the second line, an end portion on the first switching element side of the switching circuit is connected to the first line, an end portion on the second switching element side of the switching circuit is connected to the third line, one end of the reactor is connected to a junction between the first and second switching elements, and the other end of the reactor is connected to the second line, the method comprising:
    a step of executing a one-side switching mode in which, when the power supply apparatus is activated, while an ON state of the first switching element is inhibited, only the second switching element is alternately turned ON and OFF, with the ON state duration of the second switching element changed so as to have a tendency to become longer; and
    a step of executing an alternating switching mode in which the first switching element and the second switching element are alternately turned ON.

2. The power supply apparatus activating method according to claim 1, wherein the first power supply is a fuel cell, and the second power supply is a storage device.

3. The power supply apparatus activating method according to claim 1, wherein, when the one-side switching mode is executed, in a case where a current continuously flows through the reactor within a switching cycle of the second switching element, the execution of the one-side switching mode is switched to the execution of the alternating switching mode.

4. The power supply apparatus activating method according to claim 3, wherein, during one switching cycle of the second switching element when the one-side switching mode is executed, in a case where a terminal end of the current of a triangular waveform flowing through the reactor matches an end of the switching cycle, the execution of the one-side switching mode is switched to the execution of the alternating switching mode.

5. The power supply apparatus activating method according to claim 3, wherein, during a time period of half a switching cycle of the second switching element when the one-side switching mode is executed, in a case where the current flowing through the reactor monotonically increases, it is regarded that the current continuously flows through the reactor within the switching cycle.

6. A vehicle comprising:
a power supply apparatus; and
a system activating the power supply apparatus on the basis of the power supply apparatus activating method according to claim 1.

* * * * *